United States Patent

[11] 3,564,351

[72] Inventor Dean E. McCumber
Summit, N.J.

[21] Appl. No. 727,287
[22] Filed May 7, 1968
[45] Patented Feb. 16, 1971

[73] Assignee Bell Telephone Laboratories, Incorporated
Murray Hill, N.J.,
a corporation of New York

[54] SUPERCURRENT DEVICES
19 Claims, 11 Drawing Figs.

[52] U.S. Cl. .......... 317/234, 317/235; 307/306; 331/107, 332/52
[51] Int. Cl. .......... H01l 3/00, H01l 5/02, H01l 5/06
[50] Field of Search .......... 307/306; 317/234/8.1; 331/107(S); 317/234, 235(Official last shoes); 331/107(S)(Inquired); 307/306(Inquired)

[56] References Cited

UNITED STATES PATENTS

| | | | |
|---|---|---|---|
| 3,363,200 | 1/1968 | Jaklevic et al. | 332/51 |
| 3,281,609 | 10/1966 | Rowell | 307/88.5 |
| 3,458,735 | 7/1969 | Fiske | 307/306 |
| 3,370,210 | 2/1968 | Fiske | 317/235 |
| 3,423,607 | 1/1969 | Kunzler | 307/306 |

OTHER REFERENCES

Merriam, I. B. M. Tech. Discl. Bull., 7, No. 3, Aug. 1964, page 271.

*Primary Examiner*—John W. Huckert
*Assistant Examiner*—Martin H. Edlow
*Attorneys*—R. J. Guenther and Arthur J. Torsiglieri

ABSTRACT: A supercurrent device includes a shunt conductance across an interfacial region having a finite zero voltage current characteristic of, but not limited to, Josephson tunnel junctions. The effect of the conductance is to raise the switchback current to convenient and controllable values and simultaneously to decrease the capacitive time constant associated with the device.

INVENTOR
D. E. McCUMBER
BY David P. Kelley
ATTORNEY

SUPERCURRENT DEVICES

BACKGROUND OF THE INVENTION

This invention relates to cryogenic switching and logic devices, and more particularly to supercurrent devices which are characterized by effects analogous to the Josephson tunneling effect.

In a paper entitled "Possible New Effect in Superconductive Tunneling," published in the July 1, 1962 issue of Physics Letters, pages 251 to 252, D. B. Josephson predicted theoretically that a supercurrent would flow between two superconductors separated by a thin insulating barrier (i.e., an SIS supercurrent tunnel junction) by a mechanism known as two-particle superconducting tunneling. This effect has been observed and reported by P. W. Anderson and J. M. Rowell in a paper entitled "Probable Observation of the Josephson Superconducting Tunneling Effect" and published in the Mar. 15, 1963 issue of Physical Review Letters, pages 230 to 232.

Other geometries exhibit the supercurrent phenomenon but are not limited to the two-particle tunneling. P. W. Anderson and A. H. Dayem describe in Physical Review 13, 195 (1964) a superconducting bridge which has effect nearly identical to those observed in the planar SIS Josephson structure. In. U.S. Pat. application Ser. No. 561,624, filed on June 29, 1964 and assigned to applicant's assignee, J. E. Kunzler et al. teach the existence of supercurrents in point contact structures.

In general, the supercurrent devices comprise an interfacial region between a pair of superconductive regions. As pointed out in the previous examples, the interfacial region may be formed in a variety of geometries including planar SIS, point contact, and bridge type structures. The interfacial region in each of the above cases is a weak link region interconnecting the superconductive regions, the weak link breaking down when a critical current is exceeded. The weak link is the thin insulator in the SIS structure, the region of contact in the point contact contact structure and the region of minimum cross-sectional area in the bridge structure.

Each of these structures exhibits effects analogous to, but not to, the Josephson two-particle tunneling effect: When the current through the structure is increased from zero, the voltage across the interface remains zero over a range of current below a first critical current termed the Josephson current and designated $i_J$. When the current flow through the interface exceeds the Josephson current, the voltage across the interface abruptly increases to some finite value. Furthermore, when the current is reduced from above to below the Josephson current, the voltage across the interface remains finite until a second critical supercurrent, termed the switchback current and designated $i_o$, is reached whereupon the interface voltage again drops to zero.

Supercurrent structures can be used as cryogenic switches or as a variety of logic devices. See, for example, U.S. Pat. No. 3,281,609, issued to J. M. Rowell on Oct. 25, 1966, assigned to applicant's assignee and directed to superconducting tunnel junctions exhibiting the Josephson effect. The ability of supercurrent devices to perform properly such functions is hampered by two factors not accounted for in the prior art devices, especially the Josephson tunnel junction. First, the switchback current $i_o$ is generally a random value sensitive to ambient noise and typically very close to zero. Consequently, to return the device from the finite-voltage state to the zero-voltage state, it is necessary in the prior art to decrease the current from $i_J$ to nearly zero in order to insure that the current is below $i_o$ and switchback is actually achieved. The requirement that the current be decreased to nearly zero for actual switchback restricts the circuit applications of the device and because of the broad switching current range is of course for certain applications inherently slow and consumes somewhat more power than is desirable. It would be desirable therefore to be able to increase the switchback current $i_o$ to higher values and to be able to predict that value. Second, the planar structure utilized in the prior art are basically capacitive by nature. This intrinsic capacitance is ignored in the prior teachings, but when taken into account it is clear that it produces a characteristic capacitive time constant $\tau_c = C/G$. In order to increase switching speed it is desirable that $\tau_c$ be as small as possible. For a given structure with capacitance $C$, $\tau_c$ would therefore be decreased by increasing $G$, the total conductance of the junction.

SUMMARY OF THE INVENTION

In accordance with one embodiment of the invention an improved supercurrent device is characterized by a switchback current which may be raised to convenient and controllable values by the insertion of a normally conductive (rather than superconductive) shunt connected across the interfacial region. It has been found that the switch-back current is highly dependent on the value of shunt conductance. In fact, increasing $G$ increases the ratio of $i_o/i_J$ which in the limit approaches unity. Thus, in the case where $i_o$ is very nearly equal to $i_J$ it is possible to switch the device between the finite-voltage and zero-voltage states with an extremely small current "swing," with the effect that switching speed is increased and new circuit applications are admitted. The switching speed is further enhanced because an increase conductance $G$ decreases $\tau_c$ as previously pointed out. It should be noted that an increased $G$ has an opposite effect in that it increases the inherent inductive time constant $\tau_L = LG$. But this drawback is readily alleviated since $L$ can be decreased by fabrication of the device on a superconducting ground plane.

BRIEF DESCRIPTION OF THE DRAWINGS

The invention, together with its various features and advantages, can be easily understood from the following more detailed description taken in conjunction with the accompanying drawings in which.

DETAILED DESCRIPTION

Figure 1:
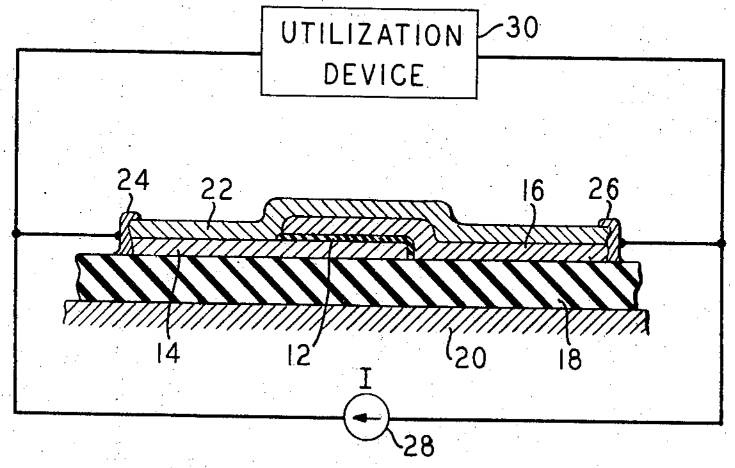
FIG. 1 is a schematic of a planar embodiment of the invention.

Turning now to FIG. 1, there is shown an illustrative embodiment of the invention comprising a superconducting tunnel junction formed in a planar structure by a thin insulative layer 12 disposed between superconductors 14 and 16. The junction structure is fabricated on a dielectric substrate 18 which is deposited on a superconducting ground plane 20. A normal conductance layer 22 is deposited over the junction so as to make electrical contact with both superconductors 14 and 16. Contact 24 and 26 are provided to enable connection of the device to external circuitry such as current source 28 and load 30. The contact 24 makes electrical contact with superconductor 14 and one end of conductance 22 whereas contact 26 makes electrical contact with superconductor 16 and the other end of conductance 22.

Typically the device is fabricated by depositing the layers in sequence upon the dielectric substrate by techniques well known in the art. A portion of the surface of the first deposited superconductor 14 is oxidized before the second superconductor 16 is deposited, thus providing the necessary insulative layer 12 between the superconductors. Finally, the conductance layer 22 and contacts 24 and 26 are fabricated. For producing large Josephson currents (e.g., $i_J \geq 0.3$ ma.) insulative layers 12 of the order of 10 to 15 Angstrom units thick are typical. A suitable junction for the purposes of practicing the present invention is a lead oxide. The conductance layer may be either a superconductor or a nonsuperconductor If the conductance layer is fabricated from a material which can become superconducting, then it should have a transition temperature less than the operating temperature of the device, so that the conductance layer remains in its normal state. Suitable normal metals include bismuth and copper which remain normal well below the 7.30° K. transition temperature of lead, and, more specifically, at the convenient liquid-helium temperature of 4.20° K.

Figures 2, 8:
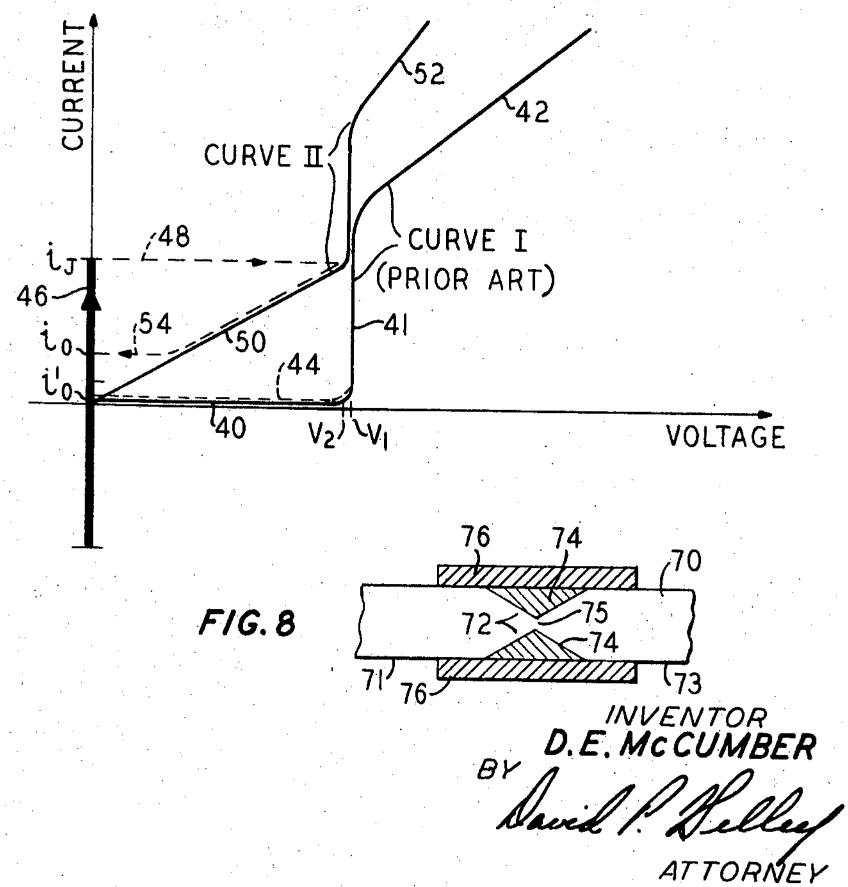
FIG. 2 is a graph of the I—V characteristic of both the prior art Josephson devices and of the present invention.
FIG. 8 is a schematic of a superconducting bridge structure embodying the principles of the invention.

The current-voltage characteristic of both the prior art and the present invention are shown in FIG. 2. The following discussion is directed to Josephson tunnel junctions, but applies with only minor modifications to other supercurrent geometries. Curve I is the characteristic typical of prior art superconducting tunnel junctions in the finite-voltage state. As illustrated by line 40 the voltage increase rapidly with current until a voltage $V_1$ is reached at which point the current increases abruptly (line 41) for a small incremental increase in voltage. $V_1$ is typically 2.0 to 4.0 millivolts depending upon the materials used. At higher current levels, the current-voltage characteristic (line 42) is that of the tunnel junction when both superconductors 14 and 16 are in a normal (nonsuperconducting) state.

Curve I, however, omits consideration of the DC Josephson effect which predicts that for a thin insulative layer 12 an additional supercurrent $i_J$ flows through the junction with no resultant voltage across the junction, as shown by line 46. The junction can carry only a limited supercurrent $i_J$, however, and above this first critical current the characteristic of the junction jumps (line 48) from line 46 to the usual current-voltage characteristic (line 42) with a corresponding increase in voltage across the junction from zero to $V_1$. In summary then, in the voltage transition from zero to $V_1$, a Josephson tunnel junction exhibits a current voltage characteristic as shown by the combination of lines 46, 48 and 42.

By way of contrast, the switchback characteristic from $V_1$ to zero, for decreasing current is shown by lines 41 and 44. As current is decreased the voltage does not abruptly decrease from $V_1$ along line 48 to zero. Rather, due to a hysteresis effect, the voltage remains nearly constant along line 41 until a second critical current $i_0'$, termed $i_0'$ switchback current, is reached. When the current is reduced below $i_0'$ the voltage rapidly decreases abruptly (line 44) to zero. The value of $i_0'$ in the prior art typically approaches zero. Since it is primarily the result of noise, it is characteristically random in value. The effect of $i_0'$ being nearly zero, as previously pointed out, is that a large current swing (i.e., from zero to $i_J$) is required to switch the device between the zero voltage and finite voltage ($V_1$) states.

In the present invention, on the other hand, the current voltage characteristic (Curve II) is modified, particularly in the switchback region, in such a way that the switchback current $i_0$ is raised to convenient and controllable values, and simultaneously the switching speed is increased.

The forward current-voltage characteristic of the invention, as with the prior art, is characterized by lines 46, 48 and 52; that is, the device exhibits at zero voltage a Josephson current $i_J$ and at a finite higher voltage $V_2$ (typically less than $V_1$, depending on the slope of line 50) at currents above $i_J$. However, the characteristic above $V_2$ is shown by line 52 (not 42) which is basically the characteristic of line 42 increased approximately by the current flow through the shunt conductance.

In the switchback region, however, the modification of the current-voltage characteristic is of primary importance to the improvement in operation of the Josephson tunnel junction. As the current is decreased from above $i_J$ the voltage follows the contour of line 52. Below $i_J$ the voltage decreases linearly along the portion of line 54 which is collinear with line 50, the latter having a slope $I/V = G$, the magnitude of the shunt conductance. The voltage decreases to zero when the current is reduced below the switchback current $i_0$ which, depending on the value of $G$ (and other parameters), may be nearly equal to $i_J$.

Figure 3:
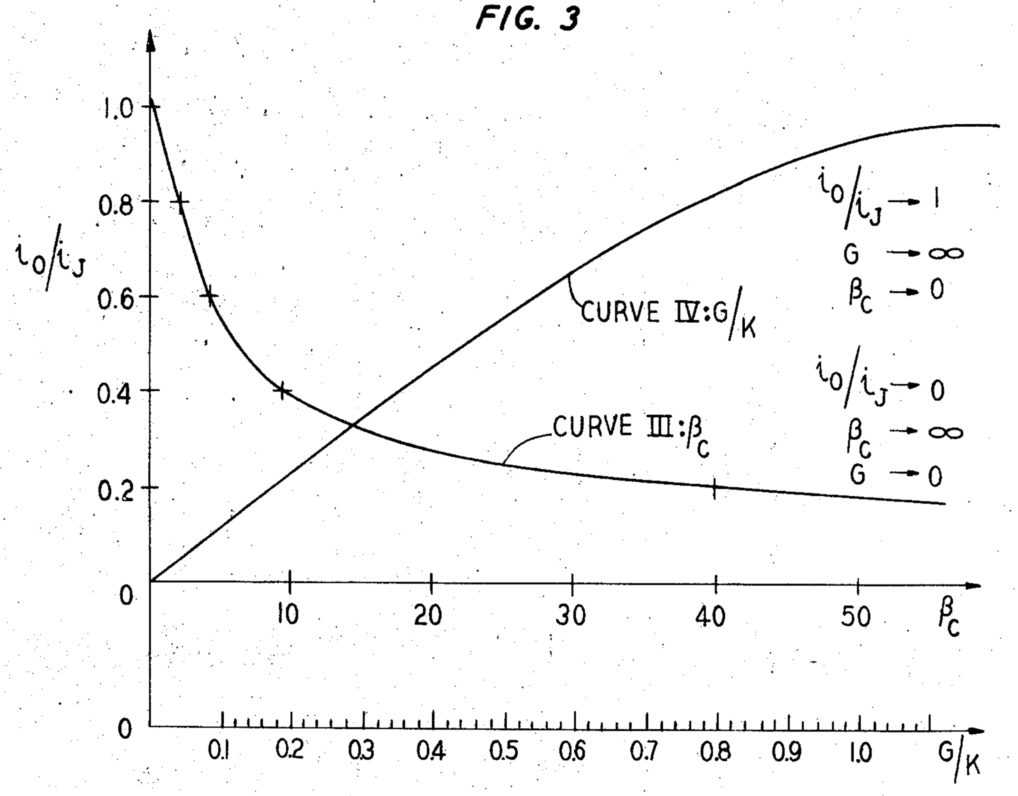
FIG. 3 is a graph showing the dependence of switchback current on conductance.

The relationship between $i_0$ and the magnitude of the conductance $G$ is shown in FIG. 3. Provided that the following inequality $$G \geq 2ei_J/(\Delta_1+\Delta_2) \qquad (1)$$

is satisfied, which is not a serious restriction, the ratio $i_0/i_J$ is a function of the dimensionless quantity $\beta_c$; where $e$ is electronic charge and $\Delta_j (j=1, 2)$ is the energy gap of the superconductor on each side of the junction. The quantity $\beta_c$ is a ratio given by $$\beta_c = \frac{4\pi e i_J C}{h\, G^2} \qquad (2)$$

where $C$ is the intrinsic capacitance of the junction, and $h$ is Planck's constant. Curve III is a graph of $i_0/i_J$ versus $\beta_c$ and shows that $i_0/i_J = 1$ at $\beta_c = 0$ and that $i_0/i_J — 0$ as $\beta_c — \infty$. The latter limit is characteristic of the prior art; that is, typically $\beta_c$-— $\infty$ (i.e., $G=0$) and consequently $i_0 —\ 0$ ($i_J$ being finite). By comparison, Curve IV is a graph of $io/i_J$ versus $G/K$ where $K^2$ is given by $$K^2 = \frac{4\pi e i_J C}{h} \qquad (3)$$

Curve IV gives the same results as Curve III. Namely, that $i_0/i_J = 0$ at $G=0$ (the prior art), whereas for non zero values of $G$ the value of $i_0/i_J$ ranges between 0 and 1 Thus, by properly choosing $G$ the ratio $i_0/i_J$, and hence the value of $i_0$, can be fixed in accordance with predetermined design criteria. For example, it is desired that $i_0 = 0.8\ i_J$ then $G/K$ should be selected to be approximately 0.724.

It was mentioned earlier that the insertion of a shunt conductance $G$ advantageously decreased the capacitive time constant, but might disadvantageously increase the inductive time constant. This latter effect is reduced by fabricating the tunnel junction on an insulated superconducting ground planet (i.e., on ground plane 20 insulated by dielectric 18). The ground plane being substantially impermeable to flux lines effectively reduces any inductance associated with the conductance and circuit leads.

LOGIC AND SWITCHING DEVICES

The present invention may operate as a variety of logic devices including AND and OR gates, a pulse generator or a simple ON-OFF switch. In the latter case, with reference to FIG. 1 again, the switch is turned ON (zero voltage) when the current $I$ of source 28 is in the range $0 \leq I < i_J$. The switch is turned OFF (finite voltage $V_1$) when $I \geq i_J$. To turn the switch back ON, the current of source 28 is reduced below the switchback current $i_0$, thus completing the cycle.

Figure 4:
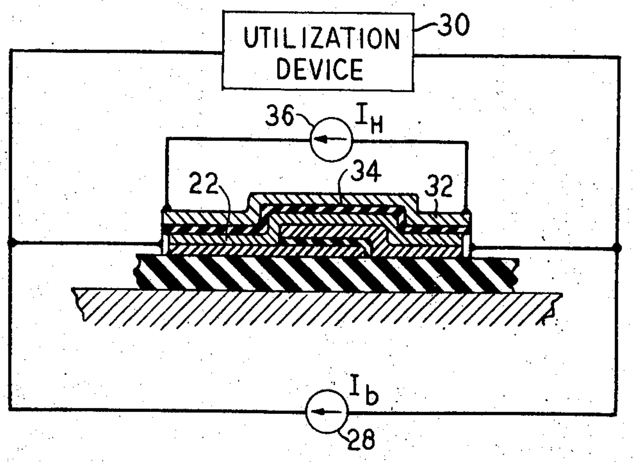
FIG. 4 is a schematic of another planar embodiment of the invention utilizing magnetic switching.

The present invention lends itself readily to a magnetically controlled switch. The basic structure of the device as shown in FIG. 4 is substantially identical to that of FIG. 1 with the addition of a magnetic control film 32 deposited over the conductance layer 22, but separated therefrom by an insulative layer 34. A variable control current source 36 is connected across the control film in order to generate a magnetic field in the junction.

Figure 5A:
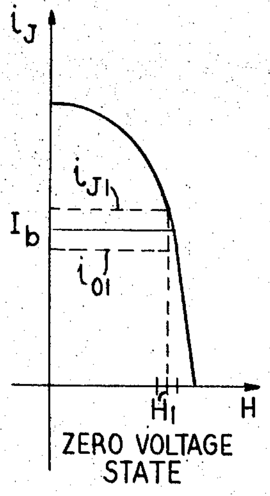
FIGS. 5A, 5B and 5C are graphs of $i_J$ versus magnetic field showing the various states of the switch of FIG. 4.
Figure 6:
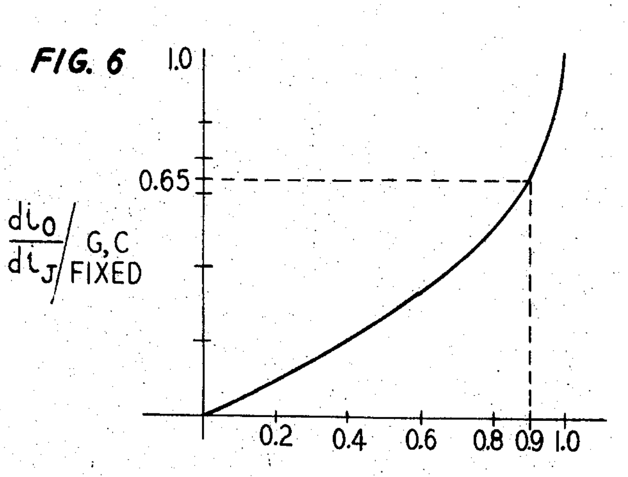
FIG. 6 is a graph showing the differential changes in $i_o$ corresponding to differential changes in $i_J$.

The operation of the device utilizes the dependence of both the Josephson current $i_J$ and the switchback current $i_0$ on the applied magnetic field $H$. That dependence is shown in part in FIG. 5A which indicates that $i_J$ decrease with increasing $H$. (For a more detailed discussion, see U.S. Pat. No. 3,281,609, especially with reference to FIG. 3 therein.) The switchback current also decreases with increasing magnetic field, but as shown in FIG. 6 generally the differential change $di_0$ is smaller than the corresponding differential change $di_J$. For example, suppose $i_0/i_J = 0.9$, then an applied field which changes $i_J$ by an amount $di_J$ would produce a corresponding change in $i_0$ by a smaller amount $di_0 = 0.65\ di_J$.

Figure 5B:
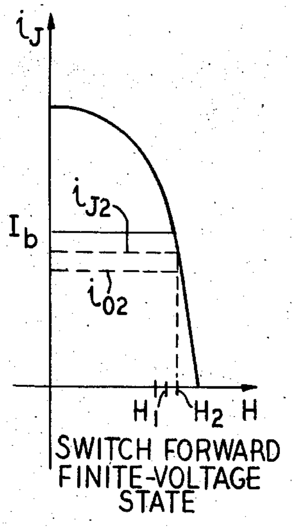
Figure 5C:
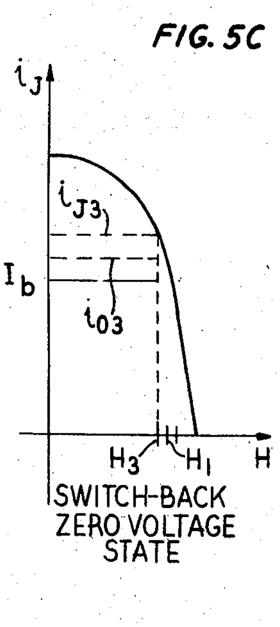

The aforementioned relationships are utilized in the present invention to provide magnetic switching while maintaining a constant current $I_b$ through the junction. Referring to FIG. 5A, consider initially that $H=H_1$ is chosen such that $i_{o1} < I_b < i_{J1}$. The switch would therefore be in a zero-voltage state. When the field is increased to $H=H_2$ (i.e., $I_H$ is increased), both the Josephson current and the switchback current decrease such that $i_{o2} < i_{J2} < I_b$ (FIG. 5B). Consequently, the device switches forward to a finite voltage state. On the other hand, when the field is reduced to $H=H_3$, the Josephson and switchback currents both increase such that $I_b=i_{o3}=i_{J3}$ (FIG. 5C). The device therefore switches back to the zero-voltage state and completes the switching cycle.

It is clear, therefore, that to reduce the range of control current required to switch the device, it is preferable that $i_o$ and $i_J$ be maintained as nearly equal as is practically possible.

The aforementioned operation, though analogous to the magnetically controlled switch of U. S. Pat. No. 3,281,609, is different in one important respect; namely, in that device, as well as in similar prior art devices, the switchback current is very nearly zero. Consequently, while the switch forward step is possible (FIG. 5B), the switchback step is not, because there is insufficient variation in $i_o$ and $i_J$ with $H$ to be able to both reduce $i_J$ below $I_b$ (FIG. 5B) and also to increase $i_o$ above $I_b$ (FIG. 5C).

ALTERNATIVE GEOMETRIES

Figure 7A:
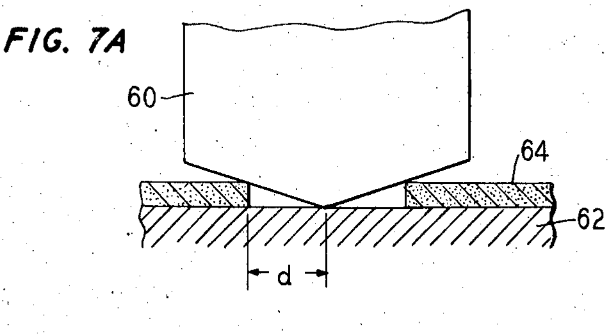
FIG. 7A is a schematic of a point contact embodiment of the invention.
Figure 7B:
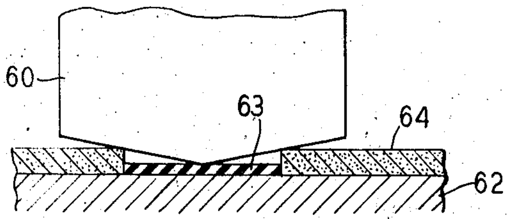
FIG. 7B is a schematic of another point contact embodiment of the invention.

Alternative Geometries embodying the principles of the present invention are shown in FIGS. 7A, 7B and 8, the external circuitry having been omitted for clarity.

A point contact embodiment is shown in FIG. 7A comprising a tapered superconducting element 60 making body-to-body contact with a planar superconductor 62 thereby defining an interface in the region of contact. The surface of superconductor 62 may be curved, however, if so desired. The contact may be either direct (superconductor to superconductor) or may be indirect through an insulative layer 63 (as shown in FIG. 7B). The taper of element 60 may be one-dimensional only, so defining a wedge, or may be two-dimensional, so defining a point. The taper may be embedded in superconductor 62 or in insulative layer 63. A conductive film 64 is deposited on the superconductor 64 so as to make contact with the tapered superconductive element 60. To reduce resonant cavity effects, it is desirable that the distance $d$ between the point of contact of elements 60 and 62 and the point of contact of conductive film 64 and and the tapered portion of superconductive element 60, be small relative to the wavelength λ Josephson oscillations given by $$\lambda=\frac{hcG}{2ei_J} \qquad (4)$$

where $h$ Planck's constant, $c$ is the velocity of light, $G$ is the conductance of film 64, $e$ is electronic charge and $i_J$ is the Josephson current. Typical dimensions of the device of FIG. 4A include a 30 mil diameter superconductor 60 having a taper 30 mils long and a point having a diameter of less than 5 microns.

A superconductive bridge is shown in FIG. 8 comprising an elongated superconductive member 70 having a tapered region 72 defining an interfacial region 75 and two separated superconductive regions 71 and 73. An insulative layer 74 surrounds the tapered region 72 and a conductive film 76 is deposited over the insulative layer 74 so as to make contact with the superconductive regions 71 and 73 but not with the tapered region 74. The insulative layer 74 may be omitted, if so desired, however. Typical dimensions include a 100$\mu$ wide superconductor 70 being about 0.1 to 1$\mu$ in thickness. The interfacial region is typically 0.5 to 5$\mu$ wide at the region of minimum taper.

The operation of both the point contact and the bridge embodiments is substantially the same as that previously described with respect to the planar structure of FIG. 1.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

I claim:

1. A supercurrent device comprising:
a pair of superconductive regions;
a weak-link interfacial region joining said superconductive regions;
said device having a hysteretic current voltage characteristic including a region of increasing current at zero voltage and first critical current at which the interfacial voltage abruptly increases from the zero voltage to some finite higher value;
and including a region of decreasing current less than the first critical current in which the interfacial voltage decreases and a second critical current, less than the first critical current, at which the interfacial voltage is again zero, said second critical current being nearly zero and varying in magnitude as a function of noise;
means for applying to said interfacial region current, the amplitude of which is variable from greater than the first critical current to less than the second critical current; and
means for establishing an increased fixed value of said second critical current comprising an electrically conductive member connected in shunt across said interfacial region.

2. The device of claim 1 wherein said interfacial region comprises an insulative member separating said superconductive regions and contiguous with at least a portion of each of said superconductive regions.

3. The device of claim 2 wherein said superconductive regions and said insulative member are planar thin films.

4. The device of claim 3 wherein said conductive member comprises a normal metal thin film in electrical contact with each of said superconductive regions.

5. The device of claim 4 wherein said conductive member is characterized by an inductance proportional to the amount of magnetic flux coupling said normal metal member and in combination with a superconducting ground plane, an insulative layer deposited on said ground plane, said device being fabricated on said insulative layer to reduce the magnitude of the inductance of said conductive member by reducing the flux coupling said normal metal member.

6. The device of claim 2 wherein one of said superconductive regions has a tapered region defining a small cross-sectional area in the vicinity of said interfacial region, and said insulative member is contiguous with the small cross-sectional area of said superconductive region.

7. The device of claim 6 wherein said tapered region of said one superconductive region is one-dimensional defining a wedge.

8. The device of claim 6 wherein said tapered region of said one superconductive region is two-dimensional defining a point.

9. The device of claim 6 wherein said conductive member comprises a normal metal thin film deposited on at least a portion of the surface of said insulative member, said metal film having an aperture exposing a portion of the surface of said insulative member, said tapered region of said other superconductive region making electrical contact with said insulative member and with the side of the aperture.

10. The device of claim 9 wherein the lateral distance $d$ between the point of contact of said tapered region with said insulative member and the point of contact with the side of the aperture is such that $$d \ll \lambda=\frac{hcG}{2ei_J}$$

where $\lambda$ is the wavelength of Josephson oscillations, $h$ is Planck's constant, $c$ is the velocity of light, $G$ is the magnitude of the conductance of said conductive member $e$ is the electronic charge and $i_J$ is the Josephson supercurrent.

11. The device of claim 1 wherein one of said superconductive regions has a tapered region defining a small cross-sectional area in body-to-body contact with said other superconductive region, and said interfacial region comprises the region of contact of said superconductive regions.

12. The device of claim 11 wherein said tapered region is one-dimensional defining a wedge.

13. The device of claim 11 wherein said tapered region is two-dimensional defining a point.

14. The device of claim 11 wherein said conductive member comprises a normal metal thin film deposited on at least a portion of the surface of said other superconductive region, said metal film having an aperture exposing a portion of the surface of said other superconductive region, said tapered region of said one superconductive region making electrical contact with said other superconductive region and the side of the aperture.

15. The device of claim 14 wherein the distance $d$ between the point of contact of said tapered region with the exposed region of said other superconductor and the point of contact with the side of the aperture is such that $$d \ll \lambda = \frac{hcG}{2ei_J}$$

where $\lambda$ is the wavelength of Josephson oscillations $h$ is Planck's constant, $c$ is the velocity of light, $G$ is the magnitude of the conductance of said conductive member, $e$ is the electronic charge and $i_J$ is the Josephson super current.

16. The device of claim 1 comprising an elongated superconductive member having a tapered region intermediate the ends thereof defining said pair of superconductive regions on either side of said tapered region and further defining said interfacial region as the region of minimum cross section of said tapered region of minimum cross section of said tapered region and an insulative region electrically separating said conductive member from said interfacial region.

17. The device of claim 16 wherein said conductive member comprises a normal metal member in electrical contact with each of said superconductive regions.

18. The device of claim 17 wherein said conductive member is characterized by an inductance proportional to the amount of magnetic flux coupling said normal metal member and in combination with a superconducting ground plane, an insulative layer deposited on said ground plane, said device being fabricated in planar thin film form on said insulative layer to reduce the magnitude of the inductance of said conductive member by reducing the flux coupling said normal metal member.

19. A supercurrent device comprising:

a pair of superconductive regions;

a weak-link interfacial region joining said superconductive regions;

said device having a hysteretic current voltage characteristic including a region of increasing current at zero voltage and a first critical current at which the interfacial voltage abruptly increases from the zero voltage to some finite higher value;

and including a region of decreasing current less than the first critical current in which the interfacial voltage decreases and a second critical current, less than the first critical current, at which the interfacial voltage is again zero, said second critical current being nearly zero and varying in magnitude as a function of noise;

means for establishing an increased value of said second critical current comprising an electrically conductive member connected in shunt across said interfacial region;

means for applying a fixed bias current to said interfacial region; and means for applying to said interfacial region a variable magnetic field such that an increase in the magnitude field reduces the first critical current below the fixed bias current thereby to increase the voltage of said interfacial region from zero voltage toe finite higher value, and such that a decrease in the magnitude of the field increase the second critical current above the fixed bias value thereby to decrease the voltage of said interfacial region to zero voltage again.